Jan. 9, 1968 D. N. TOMA 3,362,422
FLUID AMPLIFIER
Filed Dec. 21, 1964
FIG. 1
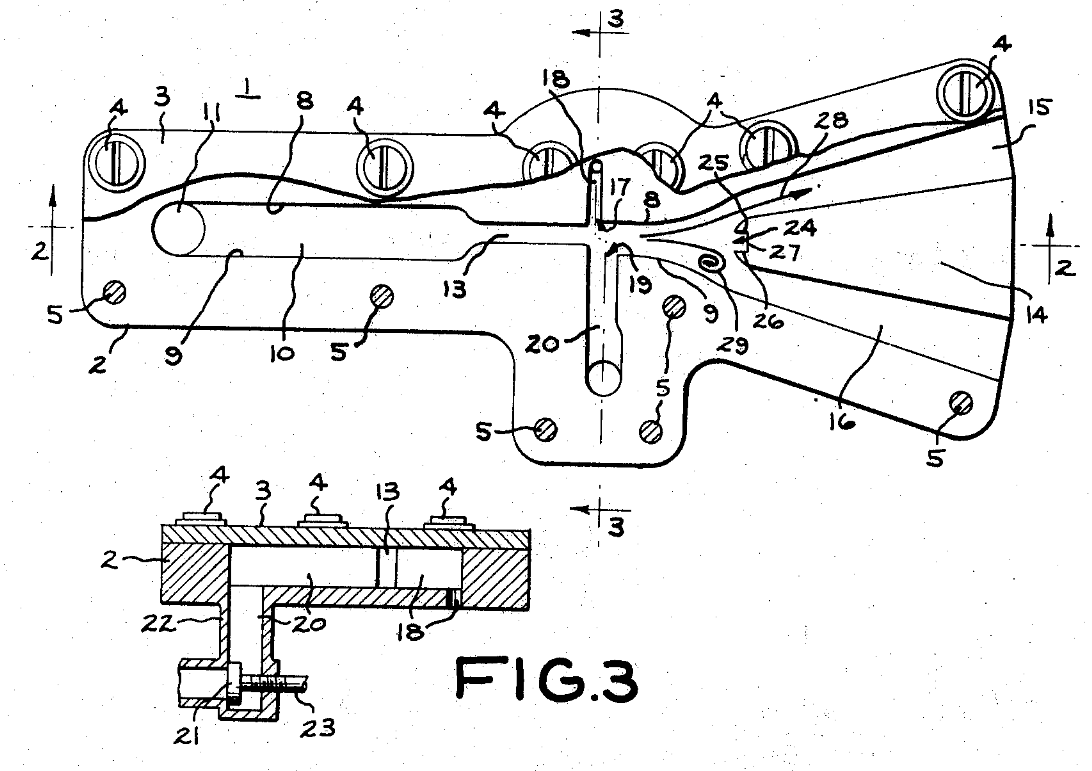
FIG. 1, FIG. 3
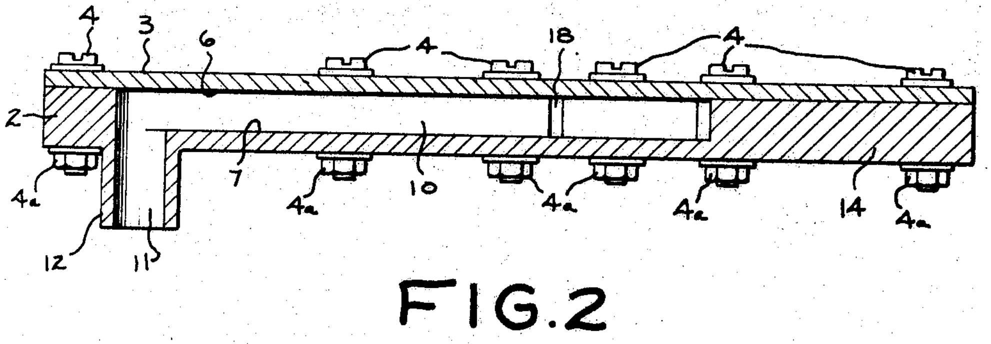
FIG. 2
INVENTOR.
DANIEL N. TOMA
BY [signature]
HIS ATTORNEY United States Patent Office 3,362,422

Patented Jan. 9, 1968

3,362,422
FLUID AMPLIFIER

Daniel N. Toma, Louisville, Ky., assignor to General Electric Company, a corporation of New York Filed Dec. 21, 1964, Ser. No. 419,672
2 Claims. (Cl. 137—81.5)

This invention relates to a fluid amplifier and more particularly to an improved fluid amplifier of the two phase medium type.

Fluid amplifiers have been used primarily in logic circuit applications utilizing small amounts of fluids under closely controlled pressures. Such devices also offer distinct advantages as reliable low cost valves for controlling large volume flows of liquid. For instance, they may be used in water supply systems and recirculation systems for clothes washers and dishwashers. For such applications digital type fluid amplifiers are preferred to the analog type. Digital type fluid amplifiers employ changes in the transverse pressure gradient across the stream of fluid to cause the stream to switch between the outlets of the amplifier while the analog type utilize an energy exchange between a main stream and a pilot stream to switch the main stream.

An additional cost savings and simplification of the mechanism is possible if a two phase medium amplifier is used; that is, if the transverse pressure gradient across the stream of liquid is provided by exposing the stream to the atmosphere rather than by exposing it to a body of liquid at ambient pressure. This may be accomplished by utilizing a symmetric amplifier in which a pair of control ports are provided for connecting opposite sides of the stream of liquid to ambient pressure. Each port is provided with a valve for selectively opening and closing that port. By opening one valve and closing the other the stream of liquid is caused to flow out a predetermined one of the amplifier outlets. Such symmetric amplifiers have the disadvantage of requiring two, interconnected valves; such a construction is expensive.

A substantial cost saving is accomplished by utilizing a non-symmetric amplifier in which a relatively small biasing port is provided for continuously connecting one side of the stream of liquid to ambient pressure. A relatively large control port is provided opposite the biasing port and a valve may be provided for selectively opening and closing the control port to selectively connect the other side of the stream of liquid to ambient pressure. When the control port is open the physical configuration of the amplifier is such as to cause the liquid to flow through one outlet; however, when the control port is closed the stream of liquid switches and flows through the other outlet. Great difficulty has been encountered in employing non-symmetric, digital type amplifiers in two phase medium applications. The stream of liquid tends to adhere to the amplifier wall having the biasing port. By very careful proportioning of the amplifier components it is possible successfully to cause the stream to flip to the other wall within a very small, predetermined pressure range. However, any appreciable pressure variation in the liquid stream results in erratic operation during which the stream of liquid cannot be caused to switch away from the side of the amplifier having the biasing port. I have found that, by causing a vortex flow of a portion of the liquid to block the outlet on the control port side, a non-symmetric, digital type amplifier will perform dependably in two phase medium applications despite wide variations in the liquid stream pressure.

Some prior art amplifiers of the analog type and symmetric digital type have used a notch in the barrier between the outlets to create a vortex flow of part of the fluid. The vortex flow in such devices has been used to increase the stability of the stream, that is, to insure that the stream of fluid remains attached to a predetermined side wall until it is desired to switch it to the other side wall.

The difficulty in using non-symmetric digital amplifiers in two phase medium applications is not instability of the liquid stream; rather it is excessive stability of the stream adjacent the biasing port side wall. From viewing prior art devices it would seem that providing a vortex flow of part of the liquid stream would increase this problem; i.e., it would be even more difficult to successfully switch the liquid stream from the biasing port side within a wide range of stream pressures. However, surprisingly, I have found the opposite to be true.

The stream of liquid entrains air from both the biasing port and the control port. As long as both are open to atmosphere (ambient pressure) the pressure differential across the stream is very small and the Coanda effect causes the stream to adhere to the biasing port side wall. When the control port is closed the air entrainment by the liquid stream causes a low pressure region to be created in the control port. This causes a substantial transverse pressure differential to exist across the liquid stream and the stream is switched to the control port side wall. In two phase medium applications, when the control port is closed, air is drawn into the amplifier through the outlet adjacent the control port side wall. This air prevents the development of an adequate transverse pressure differential and, therefore, the stream cannot be switched to the control port side wall. I have found that, by creating a vortex flow of part of the liquid which effectively closes the outlet adjacent the control port side wall, the stream of liquid can be successfully switched from the biasing port side wall to the control port side wall within a broad range of stream pressures.

An object of this invention is to provide an improved fluid amplifier of the digital type.

Another object of this invention is to provide such an improved fluid amplifier which will operate successfully in two phase medium applications involving a broad range of liquid stream pressures.

A further object of this invention is to provide such an improved fluid amplifier in which a vortex flow is formed from part of the stream of liquid to close one of the amplifier outlets when the stream is flowing through the other.

In carrying out my invention, in one form thereof, I provide a two phase medium fluid amplifier including an inlet passage connecting with a pair of outlet passages. A first side of the inlet passage is connected to ambient pressure by a relatively small biasing port and the second side is connected to ambient pressure by a relative large control port so that liquid provided to the inlet passage is biased for flow along the first wall and through a first of the outlet passages. I provide means, such as a valve, for closing the control port to switch the stream of liquid from the first wall to the second wall for flow through the second outlet passage. I include in the amplifier an intermediate wall between the outlet passages having a notch exposed to the stream of liquid flowing through the first outlet passage so as to create a vortex flow of part of the liquid to close the second outlet passage.

The subject matter which I regard as my invention is particularly pointed out and distinctly claimed in the concluding portion of the specification. My invention, however, both as to organization and method of operation, together with further objects and advantages thereof may best be understood by reference to the following description taken in conjunction with the accompanying drawing.

In the drawing:

FIGURE 1 is a plan view of a fluid amplifier constructed in accordance with one embodiment of my invention, the view being partly broken away for purposes of illustration;

FIGURE 2 is a view along line 2—2 of FIGURE 1; and

FIGURE 3 is a view along line 3—3 of FIGURE 1.

Referring now to FIGURES 1 and 2 there is shown therein an improved fluid amplifier 1 of the digital type for use in two phase medium applications. The amplifier is constructed of a bottom member 2 and a top member 3 secured together by a number of bolts 4 which pass through appropriate openings in the top member 4 and openings 5 in the lower member 2 and are secured by appropriate nuts *4a*. The members 2 and 3 form the fluid amplifier device 1 with a top wall 6, a bottom wall 7, and spaced, elongated side walls 8 and 9. The side walls 8 and 9 define an inlet passage 10. A liquid inlet opening 11 is formed adjacent one end thereof and includes a downwardly extending, hollow nipple 12 formed in lower member 2. Intermediate their ends, the side walls 8 and 9 are provided with a reduced diameter portion 13 which defines a power jet nozzle. Intermediate member or wall 14 is formed in lower member 2 between side walls 8 and 9 at the end opposite inlet opening 11. Side wall 8 and intermediate wall 14 define a first outlet passage 15 while side wall 9 and intermediate wall 14 define a second outlet passage 16, with both of the outlet passages 15 and 16 communicating with inlet passage 10.

Just downstream of the nozzle 13 the side wall 8 includes a relatively small offset 17 which is connected to a conduit 18. The offset 17 and conduit 18 together form a biasing port which continuously connects inlet passage 10 to ambient pressure (normally the atmosphere.) Opposite offset 17, the side wall 9 includes a relatively large offset 19 that is connected to atmosphere by a conduit 20, the offset 19 and conduit 20 forming together a control port for the fluid amplifier. Because of the difference in the size of the offsets 17 and 19 (assuming conduit 20 also to be open to ambient pressure) the Coanda effect will cause a stream of liquid provided to inlet passage 10 through inlet opening 11 to attach itself to side wall 8 as it emerges from nozzle 13 and thereby flow through outlet passage 15. If conduit 20 is closed, the air entrained in the liquid stream as it passes the control part will cause a decrease in pressure in the area of offset 19 which will cause a transverse pressure differential across the stream of the liquid. This transverse pressure differential tends to cause the stream of liquid to detach itself from side wall 8 and switch over and attach itself to wall 9 so that it will flow out through outlet passage 16.

Any one of a number of means may be utilized to selectively open and close conduit 20 to the atmosphere. In the way of an example, I have shown a valve 21. Valve 21 is formed with a screw threaded actuating arm 23 that is received in a hollow nipple 22 that extends downwardly from bottom member 2. By rotation of arm 23, valve 21 may be moved either into engagement with nipple 22 or out of engagement therewith so that the conduit 20, and thus the control port formed by conduit 20 and offset 19, may either be opened or closed to ambient pressure. The valve 21 is shown only for purposes of illustration and any other suitable means could be used.

Because of the Coanda effect the stream of liquid has great affinity for the side wall 8 and, in two phase medium applications the pressure differential created by closing conduit 20 to the atmosphere will not be sufficient to cause the stream of liquid always to switch over to side wall 9. This is because, in such applications, each of the outlet conduits 15 and 16 is normally connected to a relatively large region of ambient pressure and, when conduit 20 is closed, air will merely be drawn in through outlet conduit 16. This prevents a sufficient transverse pressure differential from being created across the stream of liquid. In order to overcome this problem I provide intermediate wall 14 with a notch 24 having side walls 25 and 26 and a base wall 27. With the flow of liquid through outlet passage 15 (as indicated generally by the arrow 28) a portion of the liquid is received in the notch 24, which causes it to form a vortex flow (as indicated by the arrow 29). This vortex flow effectively closes outlet passage 16 so that, when conduit 20 is closed from the atmosphere, a sufficient transverse pressure differential is created across the stream of liquid to cause it to switch from side wall 8 to side wall 9 so that it will flow out conduit 16.

When it is desired to switch the stream of liquid back to outlet passage 15, conduit 20 is again opened to the atmosphere, which eliminates the transverse pressure differential across the stream of liquid, and the Coanda effect causes the stream of liquid to switch back to wall 8 and outlet conduit 15. The notch 24 also may cause a vortex flow to close off outlet conduit 15 when the stream of liquid is flowing through outlet conduit 16; however, in fluid amplifiers of this type the Coanda effect is so strong that the fluid will consistently switch back to wall 8 when conduit 20 is opened even without a vortex flow closing off outlet conduit 15.

While in accordance with the patent statutes, I have described what at present is considered to be the preferred embodiment of my invention, it will be obvious to those skilled in the art that various changes and modifications may be made thereto without departing from the invention, and I therefore aim in the appended claims to cover all such changes and modifications as fall within the true spirit and scope of my invention.

What I claim as new and desire to secure by Letters Patent of the United States is:

1. A two phase medium fluid device comprising:

(a) an inlet passage connecting with a pair of outlet passages, (b) a relatively small biasing port connecting one wall of said inlet passage to ambient pressure to bias liquid flowing through said inlet passage for flow along said one wall and through a first of said outlet passages, (c) a relatively large control port opposite said biasing port, connecting the other wall of said inlet passage to ambient pressure, (d) means to selectively close said control port to divert liquid flowing through said inlet passage for flow along said other wall and through said second of said outlet passages, (e) and a member between said outlet passages including a notch exposed to the liquid during flow through said first outlet passage to cause a vortex flow of a portion of the liquid for closing said second outlet passage whereby closing of said control port is effective to divert the flow of liquid to said second outlet passage.

2. A two-phase medium fluid device including:

(a) a pair of elongated, spaced side walls forming an inlet passage having a liquid inlet opening adjacent one end thereof and a reduced width portion defining a nozzle intermediate the ends thereof, (b) an intermediate wall spaced downstream from said nozzle, said intermediate wall and said first side wall forming a first outlet passage and said intermediate wall and said second side wall forming a second outlet passage, (c) said first side wall being formed with a relatively small offset adjacent the downstream end of said nozzle, a first conduit connecting said relatively small offset to ambient pressure to bias liquid flowing through said nozzle for flow along said first side wall through said first outlet passage, (d) said second side wall being formed with a relatively large offset adjacent the downstream end of said nozzle, a second conduit connecting said relatively large offset to ambient pressure and means for selectively closing said second conduit to divert the liquid for flow along said second wall through said second outlet passage, (e) said intermediate wall being formed with a notch exposed to the liquid during flow through said first outlet passage to cause a vortex flow of a portion of the liquid for closing said second outlet passage whereby closing of said second conduit is effective to divert the flow of liquid to said second outlet passage.

References Cited

UNITED STATES PATENTS

| | | | |
|---|---|---|---|
| 3,001,539 | 9/1961 | Hurvitz | 137—81.5 |
| 3,072,147 | 1/1963 | Allen et al. | 137—81.5 |
| 3,148,691 | 9/1964 | Greenblott | 137—81.5 |
| 3,180,575 | 4/1965 | Warren | 137—81.5 X |
| 3,181,546 | 5/1965 | Boothe | 137—81.5 |
| 3,220,428 | 11/1965 | Wilkerson | 137—81.5 |
| 3,225,780 | 12/1965 | Warren et al. | 137—81.5 |

M. CARY NELSON, *Primary Examiner.*

S. SCOTT, *Examiner.*